United States Patent Office 3,045,023
Patented July 17, 1962

3,045,023
DIALKYLAMINOETHYL DIPHENYLMETHYL-
PIPERIDINEPROPIONATES
Kurt J. Rorig, Glenview, Ill., assignor to G. D. Searle
& Co., Chicago, Ill., a corporation of Delaware
No Drawing. Filed Apr. 6, 1960, Ser. No. 20,238
7 Claims. (Cl. 260—294.3)

This invention relates to dialkylaminoalkyl diphenyl-alkylpiperidinealkanoates and processes for the manufacture thereof. More particularly, this invention relates to chemical compounds of the formula

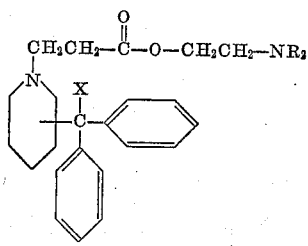

wherein X represents hydrogen or a hydroxy radical, and R represents an alkyl radical.

Among the alkyl radicals represented by R, especially lower alkyl radicals are preferred, which is to say methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ radicals wherein $n$ represents an integer amounting to less than 9.

Equivalent to the foregoing basic esters for purposes of this invention are corresponding acid addition salts, the formula of which is

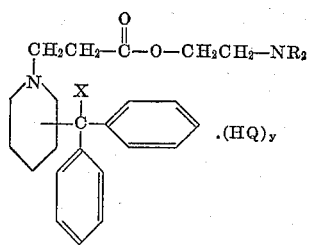

wherein X and R are defined as before; Q represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which in combination with the cationic portion of a salt aforesaid, is neither pharmacologically nor otherwise undesirable in physiological dosage; and $y$ represents 1 or 2.

The compounds of this invention are useful because of their valuable pharmacological properties. In particular, they are anti-bacterial and anti-fungal agents effective against *B. subtilis*, *E. coli*, and *Trichophyton mentagrophytes*. They also manifest eurhythmic and anti-inflammatory properties, and they appear to depress the central nervous system.

Manufacture of the basic esters hereof proceeds by heating an appropriate piperidine of the formula

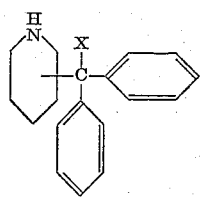

and dialkylaminoethyl acrylate of the formula

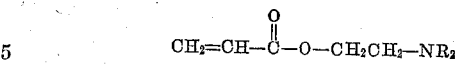

in an inert solvent medium, the meanings of X and R in the formulas remaining as before. Conversion of the basic esters so produced to acid addition salts is accomplished by admixture with 1 or 2 equivalents of inorganic or strong organic acids, the anionic portions of which conform to Q as hereinabove set forth.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

2-dimethylaminoethyl 4-(diphenylhydroxymethyl) - 1-piperidinepropionate.—A solution of 134 parts of α,α-diphenyl-4-piperidinemethanol and 72 parts of 2-dimethylaminoethyl acrylate in 2500 parts of butanone is heated at the boiling point under reflux for 12 hours. The resultant solution is made just acid with hydrogen chloride dissolved in 2-propanol and then filtered. The filtrate is diluted with anhydrous ether to precipitate an oil. Supernatant solvent is decanted from the oil, which is thereupon mixed with an excess of aqueous sodium hydroxide. The mixture thus obtained is extracted with ether. The ether extract, dried over anhydrous sodium sulfate and stripped of solvent by vacuum distillation, affords 2-dimethylaminoethyl 4-(diphenylhydroxymethyl)-1 - piperidinepropionate as the residue, an oil resistant to crystallization. The product has the formula

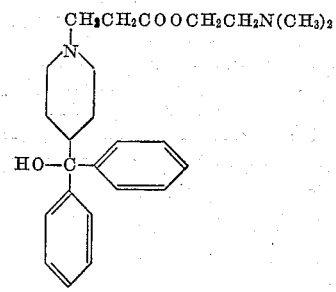

Example 2

2 - diethylaminoethyl 4 - (diphenylhydroxymethyl) - 1-piperidinepropionate dihydrobromide.—A solution of 134 parts of α,α-diphenyl-4-piperidinemethanol and 86 parts of 2-diethylaminoethyl acrylate in 2500 parts of butanone is heated at the boiling point under reflux for 8 hours. At this point, 116 parts of maleic acid is introduced. Solvent is removed by decantation, and the residue is partitioned between ether and aqueous sodium hydroxide. To the ethereal phase, dried over solid potassium carbonate, is added sufficient hydrogen bromide dissolved in absolute ethanol to make the resultant solution barely acid. The precipitate which forms is 2-diethylaminoethyl 4-(diphenylhydroxymethyl) - 1 - piperidinepropionate dihydrobromide, which, recovered on a filter and recrystallized from methanol, melts at approximately 244–245°. The product has the formula

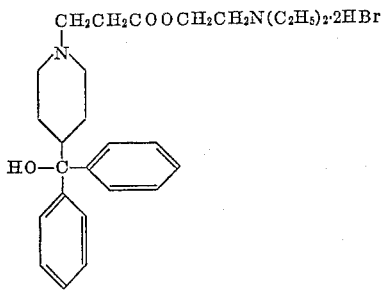

Example 3

*2 - diethylaminoethyl 3 - (diphenylhydroxymethyl) - 1-piperidinepropionate.*—A solution of 134 parts of α,α-diphenyl-3-piperidinemethanol and 86 parts of 2-diethylaminoethyl acrylate in 2500 parts of butanone is heated at the boiling point under reflux for 8 hours. There is then introduced 116 parts of maleic acid, precipitating an oil which is isolated by decantation of the supernatant solvent. The oil is partitioned between ether and aqueous sodium hydroxide. The ethereal phase, dried over solid potassium carbonate and stripped of solvent by vacuum distillation, affords 2 - diethylaminoethyl 3 - (diphenylhydroxymethyl)-1-piperidinepropionate as the residue. The product has the formula

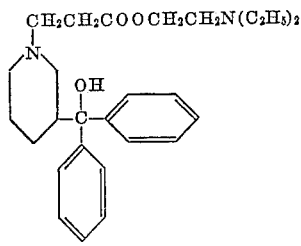

Example 4

*2-dimethylaminoethyl 4-(diphenylmethyl)piperidine-1-propionate dihydrochloride.*—A solution of 126 parts of 4-(diphenylmethyl)piperidine and 72 parts of 2-dimethylaminoethyl acrylate in 2500 parts of butanone is heated at the boiling point under reflux for 12 hours. The resultant solution is made just acid by addition of hydrogen chloride dissolved in 2-propanol. The resultant mixture is filtered to remove unreacted starting material. The filtrate is warmed and diluted with anhydrous ether to the point of incipient turbidity. Upon standing and chilling, 2-dimethylaminoethyl 4-(diphenylmethyl) - 1 - piperidinepropionate dihydrochloride precipitates as a white powder which, recrystallized from a mixture of absolute ethanol and anhydrous ether, melts at 224–227°. The product has the formula

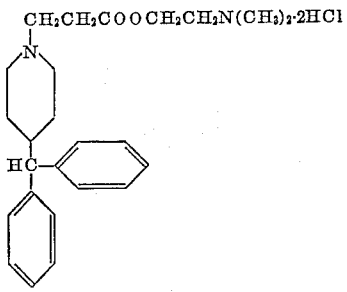

Example 5

*2 - diethylaminoethyl 4 - (diphenylmethyl)piperidine-1-propionate dihydrochloride.*—A solution of 126 parts of 4-(diphenylmethyl)piperidine and 86 parts of 2-diethylaminoethyl acrylate in 2500 parts of butanone is heated at the boiling point under reflux for 21 hours. The resultant mixture is filtered hot, and to the hot filtrate is added sufficient 2-propanolic hydrogen chloride to effect slight acidity. Upon standing, 2-diethylaminoethyl 4-(diphenylmethyl) - 1 - piperidinepropionate dihydrochloride precipitates as a white gel which, filtered off and washed thoroughly with ether, melts at approximately 248–250°. The product has the formula

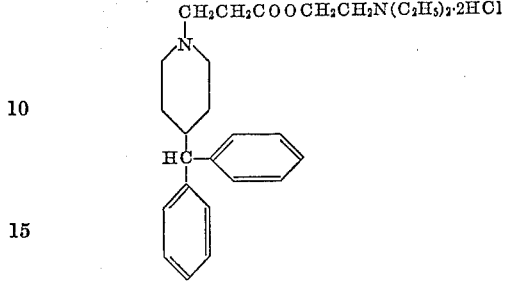

What is claimed is:
1. A compound of the formula

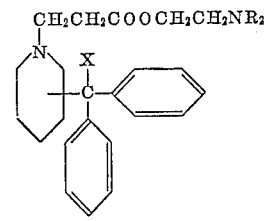

wherein X represents a member of the group consisting of

H and OH and R represents an alkyl radical, the formula thereof being

—$C_nH_{2n+1}$ wherein *n* represents a positive integer amounting to less than 9.

2. A compound of the formula

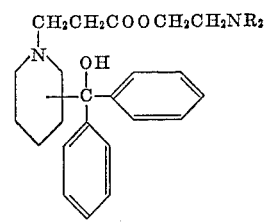

wherein R represents an alkyl radical, the formula thereof being

—$C_nH_{2n+1}$ wherein *n* represents a positive integer amounting to less than 9.

3. A compound of the formula

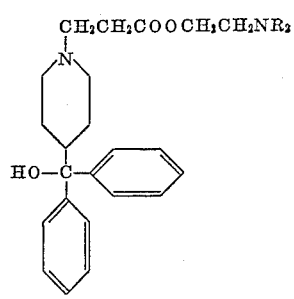

wherein R represents an alkyl radical, the formula thereof being

—$C_nH_{2n+1}$ wherein *n* represents a positive integer amounting to less than 9.

4. 2-diethylaminoethyl 4 - (diphenylhydroxymethyl)-1-piperidinepropionate.

5. A compound of the formula
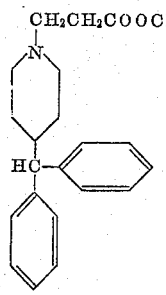
wherein R represents an alkyl radical, the formula thereof being
$$-C_nH_{2n+1}$$
wherein $n$ represents a positive integer amounting to less than 9.
6. 2-diethylaminoethyl 4 - (diphenylmethyl)-1-piperidinepropionate.
7. 2-dimethylaminoethyl 4-(diphenylmethyl)-1-piperidinepropionate.
No references cited.